United States Patent
Fujihara (10) Patent No.: US 7,151,887 B2
(45) Date of Patent: Dec. 19, 2006

(54) COPY CONTROLLING METHOD AND SYSTEM OF DIGITAL CONTENTS

(75) Inventor: Shiro Fujihara, Tokyo (JP)

(73) Assignee: NEC Corporation (JP)

( * ) Notice: Subject to any disclaimer, the term of this patent is extended or adjusted under 35 U.S.C. 154(b) by 1100 days.

(21) Appl. No.: 09/777,467

(22) Filed: Feb. 6, 2001

(65) Prior Publication Data

US 2001/0016111 A1    Aug. 23, 2001

(30) Foreign Application Priority Data

Feb. 10, 2000    (JP) .............................. 2000-033226

(51) Int. Cl.
H04N 5/91    (2006.01)
G11B 15/04    (2006.01)

(52) U.S. Cl. .............................. 386/94; 386/1; 386/94; 386/95; 386/102; 360/60

(58) Field of Classification Search .................. 386/83, 386/94, 102, 95, 96, 1; 380/224–225, 239, 380/206, 209, 201; 360/60; 369/84–85
See application file for complete search history.

(56) References Cited

U.S. PATENT DOCUMENTS

| 5,719,937 A | 2/1998 | Warren et al. |
| 5,892,548 A | 4/1999 | Kim |
| 5,991,452 A | 11/1999 | Shimizu et al. |
| 5,991,499 A * | 11/1999 | Yagasaki et al. ............... 386/94 |
| 6,266,482 B1 * | 7/2001 | Yagasaki et al. ............... 386/94 |
| 6,374,036 B1 * | 4/2002 | Ryan et al. .................... 386/94 |
| 2004/0005076 A1 * | 1/2004 | Hosaka et al. ............... 382/100 |

FOREIGN PATENT DOCUMENTS

| EP | 0 969 462 A1 | 8/1995 |
| EP | 0 667 720 A1 | 1/2000 |
| JP | 6-311043 | 11/1994 |
| JP | 7-30855 | 1/1995 |
| JP | 10-200504 | 7/1998 |

OTHER PUBLICATIONS

Japanese Office Action issued Oct. 1, 2002 (w/ English translation of relevant portion).
International Search Report.

* cited by examiner

Primary Examiner—Thai Tran
Assistant Examiner—Jamie J Vent
(74) Attorney, Agent, or Firm—Dickstein, Shapiro, LLP.

(57) ABSTRACT

In a system for recording digital contents compressed and delivered by the MPEG (Moving Picture Experts Group) standard, in decoding the contents, even a DCT coefficient of the digital contents is required in a discrete cosine transform (DCT) unit, according to the attribute information belonging to the digital contents, of the DCT coefficients within a block, some AC coefficients remain and the other AC coefficients are turned to 0, and the obtained DCT coefficients are again encoded so to create stream data for recording.

15 Claims, 6 Drawing Sheets

| 20 | 15 | 0 | 0 | 0 | 0 | 0 | 0 |
|---|---|---|---|---|---|---|---|
| 12 | 0 | 0 | 0 | 0 | 0 | 0 | 0 |
| 8 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

PROCESSED COEFFICIENTS WITHIN BLOCK

| 1 | 2 | 6 | 7 | 15 | 16 | 28 | 29 |
|---|---|---|---|----|----|----|----|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 4

| 20 | 15 | 10 | 6 | 0 | 0 | 0 | 0 |
|----|----|----|---|---|---|---|---|
| 12 | 8  | 5  | 0 | 0 | 0 | 0 | 0 |
| 8  | 4  | 0  | 0 | 0 | 0 | 0 | 0 |
| 3  | 0  | 0  | 0 | 0 | 0 | 0 | 0 |
| 0  | 0  | 0  | 0 | 0 | 0 | 0 | 0 |
| 0  | 0  | 0  | 0 | 0 | 0 | 0 | 0 |
| 0  | 0  | 0  | 0 | 0 | 0 | 0 | 0 |
| 0  | 0  | 0  | 0 | 0 | 0 | 0 | 0 |

ORIGINAL COEFFICIENTS WITHIN BLOCK

FIG. 5

| 20 | 15 | 0 | 0 | 0 | 0 | 0 | 0 |
|----|----|---|---|---|---|---|---|
| 12 | 0  | 0 | 0 | 0 | 0 | 0 | 0 |
| 8  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |

PROCESSED COEFFICIENTS WITHIN BLOCK

COPY CONTROLLING METHOD AND SYSTEM OF DIGITAL CONTENTS

BACKGROUNDS OF THE INVENTION

1. Field of the Invention

The present invention relates to a system for recording digital contents and its controlling method, and more particularly to a method and system for controlling record of digital contents delivered through a broadcast or a network.

2. Description of the Related Art

At present, the contents (image and sound) delivered through a broadcast or Internet are digital data. In the future, the ratio of the digital contents to be delivered is more and more increased compared with the analogue signal method.

Under the present circumstances, illegal copies of digital contents are prevalent because digital data can be copied without deteriorating in the quality.

In order to prevent from this illegal copy, hitherto, a content creator has tried to secure the contents, for example, by scrambling the contents.

In this contents protecting method by using scramble, however, once an algorithm for releasing the scramble is cracked, thereafter the contents can be copied as much as one likes.

Then, hitherto, copying the contents is limited by inserting non-visible information (digital watermark) into an image.

The contents generally include the following four types of recording controlling information to the effect that:

recording is prohibited (hereinafter, referred to as Never-Copy)

it was recorded once and no more recording is permitted (hereinafter, referred to as NoMoreCopy)

only one recording is permitted (hereinafter, referred to as CopyOnce)

recording is free (hereinafter, referred to as CopyFree).

With respect to the contents of NeverCopy and NoMore-Copy, in view of securing a copyright of an owner of the contents, recording operation itself has been prohibited on the side of a device, even if someone tries to record the contents.

Even if a recording device is programmed to record contents at a predetermined delivering time of the contents by setting the recording start, when the same contents are of the NeverCopy or the NoMoreCopy, nothing is recorded in the recording device. Since a user cannot know the recording controlling information of the contents delivered through a broadcast or a network, he or she doesn't know immediately why nothing has been recorded in the recording device programmed to record the contents and he or she may take it for a setting mistake of a timer or others.

Therefore, a user judges that something is wrong with the recording device and for example, some users may make a complaint to a maker who provided the recording device, which is a much burden to the maker.

SUMMARY OF THE INVENTION

In view of the above problem, an object of the present invention is to provide a copy controlling system and method for preventing from illegal copying of digital contents.

Another object of the present invention is to provide a copy controlling system and method capable of clearing the recording attribute by reproducing the recorded contents in the case of copying contents illegally without knowing the attribute. Other objects, features, and advantages of the present invention will be apparent to those versed in the art from the following description of an embodiment.

According to the first aspect of the invention, a copy controlling system in a device for receiving and recording compressed and encoded digital contents, comprises a means for changing orthogonal transform coefficients for every block obtained by decoding processing of the digital contents, depending on attribute information relative to copying restriction of the digital contents, and a means for creating stream data for recording after encoding again the orthogonal transform coefficients for every block.

According to the second aspect of the invention, a copy controlling system in a device for recording digital contents compressed and delivered by the MPEG (Moving Picture Coding Experts Group) standard, comprises a means for requiring even a discrete cosine transform (referred to as "DCT") coefficient of the digital contents, in decoding the digital contents, a within-block coefficient controlling means for changing the DCT coefficients within a block, according to attribute information relative to recording restriction of the digital contents, and a means for creating stream data for recording after encoding again the obtained DCT coefficients.

In the preferred construction, the attribute information of the digital contents includes at least one of the following information: recording is prohibited (NeverCopy); since it was recorded once, no more recording is permitted (No-MoreCopy); only one recording is permitted (CopyOnce); and recording is free (CopyFree), and the within-block coefficient controlling means turns to all 0, the values of the DCT coefficients within one block other than a DC (direct current) component and a few AC (Alternating Current) components of a low frequency region, based on the attribute information, as for the digital contents of the NeverCopy or the NoMoreCopy.

In another preferred construction, in the case of the digital contents whose attribute information is the CopyOnce, information for changing the above to the attribute NoMore-Copy is added to the DCT coefficients.

In another preferred construction, in the within-block coefficient controlling means, in the case of the digital contents whose attribute information is the NeverCopy or the NoMoreCopy, the number of the AC components whose values remain in the DCT coefficients within one block is increased or decreased periodically with time.

In another preferred construction, in the within-block coefficient controlling means, in the case of the digital contents whose attribute information is the NeverCopy or the NoMoreCopy, the number of the AC coefficients whose values remain in the DCT coefficients within one block is varied, based on the compression ratio of the digital contents; and in the case of the digital contents having a high compression ratio, the number of the AC coefficients whose values remain is set small, while in the case of the digital contents having a low compression ratio, the number of the AC coefficients whose values remain is set large.

According to the third aspect of the invention, a recording data controlling system for receiving a stream selected by a selector, of the MPEG (Moving Picture Coding Experts Group) stream delivered through a broadcast or a network and the reproduced MPEG stream from a reproducing device, comprises a demultiplexer for separating the received MPEG stream into video data and data other than the video data, a variable-length code decoder for decoding the video data separated by the demultiplexer into even discrete cosine transform (referred to as "DCT") coefficients and classifying the above into run-length and level of the MPEG standard, a within-block coefficient controlling unit for turning to 0 the values of the DCT coefficients within a block other than a DC component and a predetermined number of AC components of low frequency region, a variable-length code coder for converting the coefficients from the within-block coefficient controller into variable-length codes, a barrel shifter for combining together code data of variable-length from the variable-length code coder and creating the MPEG video stream, a FIFO memory for temporarily storing data other than the video data separated by the demultiplexer, and a multiplexer for multiplexing the video data from the barrel shifter and the data other than the video data from the FIFO memory so to supply the MPEG stream for recording.

In the preferred construction, the attribute information relative to recording restriction of the received MPEG stream is at least one of the following cases: recording is prohibited (NeverCopy); since it was recorded once, no more recording is permitted (NoMoreCopy); only one recording is permitted (CopyOnce); and recording is free (CopyFree), the attribute information of the MPEG stream is supplied via another path different from that of the received MPEG stream, and when the attribute information of the MPEG stream is the NeverCopy or the NoMoreCopy, the attribute information is supplied to the within-block coefficient controlling unit, where the values of all the coefficients within one block other than a DC component and a AC component adjacent to the DC component are turned to all 0.

In another preferred construction, the within-block coefficient controlling unit further includes a latch circuit which is cleared every time a block start signal indicating the initial value within one block becomes active and preserves the output of an adder every time the AC component within one block is supplied, an adder for adding the output of the latch circuit and run-length supplied from the variable-length code decoder, the addition result of the adder indicating the number of the coefficient at a time of zigzag scanning the DCT coefficients within a block, a comparator for comparing the output of the adder with the position of the AC coefficient whose value remains which is predetermined, and a mask circuit for performing mask processing on the received DCT coefficients, based on the output from the comparator, and supplying the processed DCT coefficients.

According to the fourth aspect of the invention, a copy controlling method of digital contents, comprises the steps of a step of receiving compressed and encoded digital contents, requiring orthogonal transform coefficients for every block of the digital contents in decoding the digital contents, and changing the orthogonal transform coefficients, depending on attribute information relative to copying restriction of the digital contents, and a step of creating stream data for recording after encoding again the obtained orthogonal transform coefficients.

According to the fifth aspect of the invention, a copy controlling method of digital contents in a system for recording the digital contents compressed and delivered by the MPEG (Moving Picture Coding Experts Group) standard, comprises the steps of a step of requiring even a discrete cosine transform (referred to as "DCT") coefficient of the digital contents, in decoding the digital contents, and changing the DCT coefficients within a block, according to attribute information relative to recording restriction of the digital contents, and a step of creating stream data for recording after encoding again the obtained DCT coefficients.

In the preferred construction, the attribute information of the digital contents includes at least one of the following information: recording is prohibited (NeverCopy); since it was recorded once, no more recording is permitted (NoMoreCopy); only one recording is permitted (CopyOnce); and recording is free (CopyFree), and as for the digital contents whose attribute information is the NeverCopy or the NoMoreCopy, the values of the DCT coefficients within one block other than a DC (direct current) component and a few AC (Alternating Current) components of a low frequency region are turned to all 0.

In another preferred construction, in the case of the digital contents whose attribute information is the CopyOnce, information for changing the above to the attribute NoMoreCopy is added to the DCT coefficients.

In another preferred construction, in the case of the digital contents whose attribute information is the NeverCopy or the NoMoreCopy, the number of the AC components whose values remain, in the DCT coefficients within one block, is increased or decreased periodically with time, not turned to 0.

In another preferred construction, in the case of the digital contents whose attribute information is the NeverCopy or the NoMoreCopy, the number of the AC coefficients whose values remain, in the DCT coefficients within one block, is varied, based on the compression ratio of the digital contents; and in the case of the digital contents having a high compression ratio, the number of the AC coefficients whose values remain is set small, while in the case of the digital contents having a low compression ratio, the number of the AC coefficients whose values remain is set large.

According to another aspect of the invention, a computer readable memory for storing a copy controlling program for executing a copy control of digital contents while controlling a computer, the copy controlling program including a step of receiving compressed and encoded digital contents, requiring orthogonal transform coefficients for every block of the digital contents, in decoding the digital contents, and changing the orthogonal transform coefficients, depending on attribute information relative to copying restriction of the digital contents, and a step of creating stream data for recording after encoding again the obtained orthogonal transform coefficients.

According to a further aspect of the invention, a computer readable memory for storing a copy controlling program for executing a copy control of digital contents while controlling a computer in a system for recording the digital contents compressed and delivered by the MPEG (Moving Picture Coding Experts Group) standard, the copy controlling program including a step of requiring even a discrete cosine transform (referred to as "DCT") coefficient of the digital contents in decoding the digital contents, and changing the DCT coefficients, according to attribute information relative to recording restriction of the digital contents, and a step of creating stream data for recording after encoding again the obtained DCT coefficients.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the present invention, a system for recording the digital contents compressed and delivered according to the MPEG (Moving Picture Coding Experts Group) standard, comprises a means for requiring even a discrete cosine transform (hereinafter, referred to as DCT) coefficient of the digital contents, in decoding the digital contents, and adding or deleting information to and from the DCT coefficient, depending on the attribute characteristic of the same digital contents, and a means for creating stream data after encoding the obtained DCT coefficients again, wherein the created stream is recorded.

The information (recording controlling information) includes to the effect that, for example:

recording is prohibited (hereinafter, referred to as NeverCopy)

it was recorded once and no more recording is permitted (hereinafter, referred to as NoMoreCopy)

only one recording is permitted (hereinafter, referred to as CopyOnce)

recording is free (hereinafter, referred to as CopyFree).

In a system for receiving and recording the contents compressed by the MPEG which are sent through a satellite broadcast or a CATV (Community Antenna Television) broadcast, even a discrete cosine transform (DCT) coefficient is decoded in decoding the contents.

A system related to the present invention is to process the DCT coefficient depending on the attribute of the contents in recording the contents, and in the case of the contents having the attribute information, NeverCopy or NoMoreCopy, the DC components of the DCT coefficient and a few AC components of a low frequency region within a block 8×8, which have been decoded, are left as they are, the values of the other coefficients are turned to 0 and encoding is performed contrary to the decoding, so as to create and record the MPEG stream.

In the case of the contents having the attribute information, CopyOnce, the information for changing the attribute to NoMoreCopy is added to the decoded DCT coefficients in order to record no more the contents copied this time and encoding is performed so to create and record the MPEG stream.

In the case of the contents having the attribute information, CopyFree, encoding is performed with nothing performed on the decoded DCT coefficients, so to create and record the MPEG stream.

Although the number of the AC components to be left as they are is defined as a constant in the case of the contents having the attribute information, NeverCopy or NoMoreCopy, in the embodiment of the present invention, the number may be controlled depending on the compression ratio of the contents.

In the form of the embodiment of the present invention, in the case of the digital contents having the attribute information, CopyOnce, information for changing the attribute to NoMoreCopy may be added to the DCT coefficients.

Figure 1:
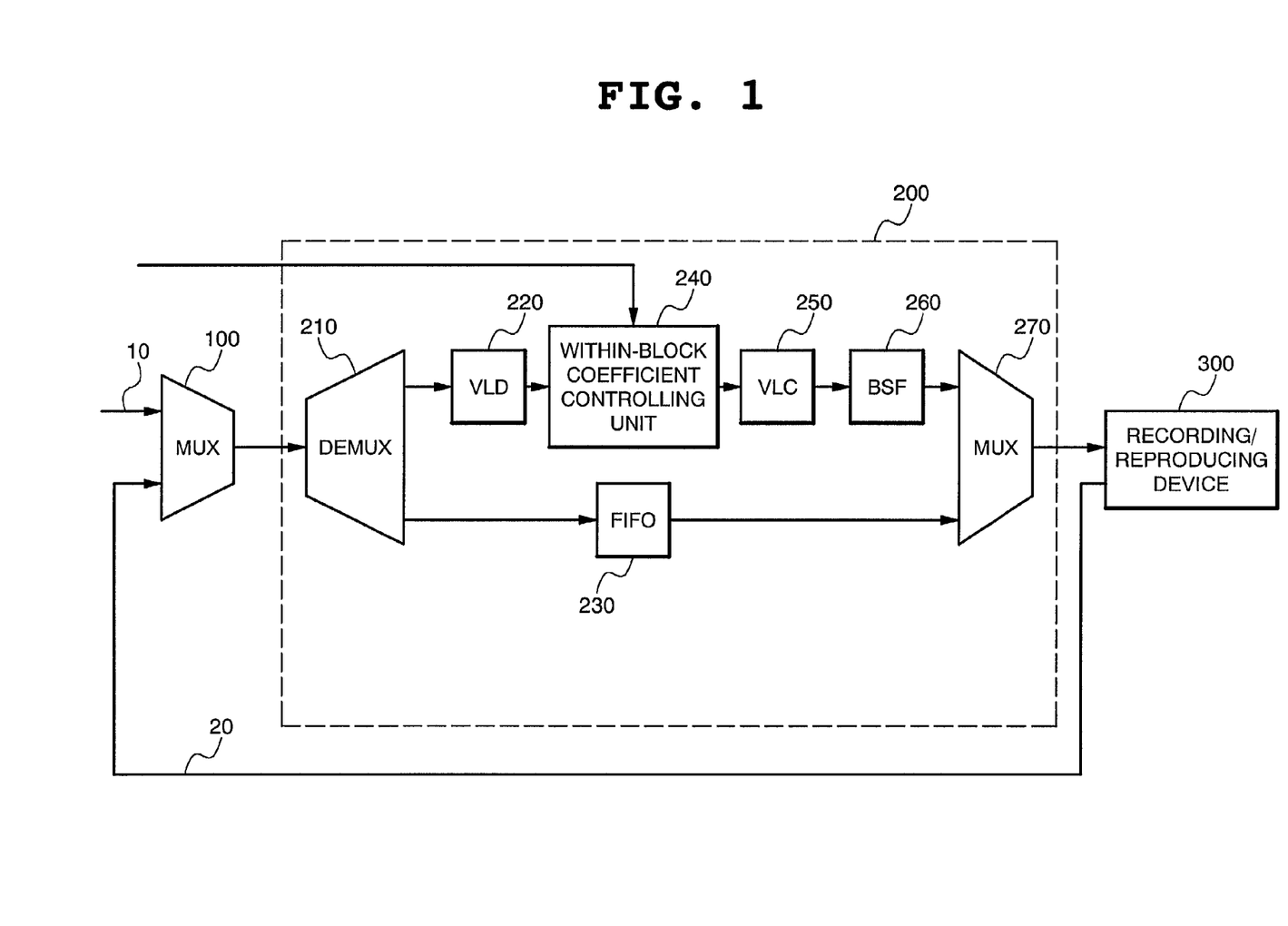
FIG. 1 is a view showing the constitution of a copy controlling system of digital contents according to an embodiment of the present invention.

According to one embodiment of the present invention, a recording data controller 200 which receives a stream which a selector selects, of the MPEG stream delivered through a broadcast or a network and the playback MPEG stream from a reproducing device, comprises a demultiplexer 210 for separating the received MPEG stream into video data and the data other than the video data, a variable-length code decoder 220 for decoding the video data separated by the demultiplexer 210 into even DCT coefficients, so to classify them into the level and the run-length of the MPEG standard, a within-block coefficient controlling unit 240 for turning to 0 the values of the others than the DC component and the predetermined number of AC components of a low frequency region as for the DCT coefficients within a block, a variable-length code coder 250 for converting the coefficients from the within-block coefficient controller into variable-length codes, a barrel shifter (BSF) 260, combining the data of the variable-length codes from the variable-length code coder 250, for creating the video stream of the MPEG, a FIFO memory 230 for temporarily storing the data other than the video data separated by the demultiplexer 210, and a multiplexer 270 for multiplexing the video data from the barrel shifter 260 and the data other than the video data from the FIFO memory so as to supply the MPEG stream. The MPEG stream supplied from the multiplexer 270 is supplied to a recording device (300).

In the embodiment of the present invention, when the attribute information of the MPEG stream is supplied through another path different from that of the same received MPEG stream and the attribute information of the same MPEG stream is NeverCopy or NoMoreCopy, the same attribute information is supplied to the within-block coefficient controlling unit, where all the coefficients other than the coefficients of the DC component and three AC components adjacent to the same DC component within a block 8×8 are turned to 0.

Figure 6:
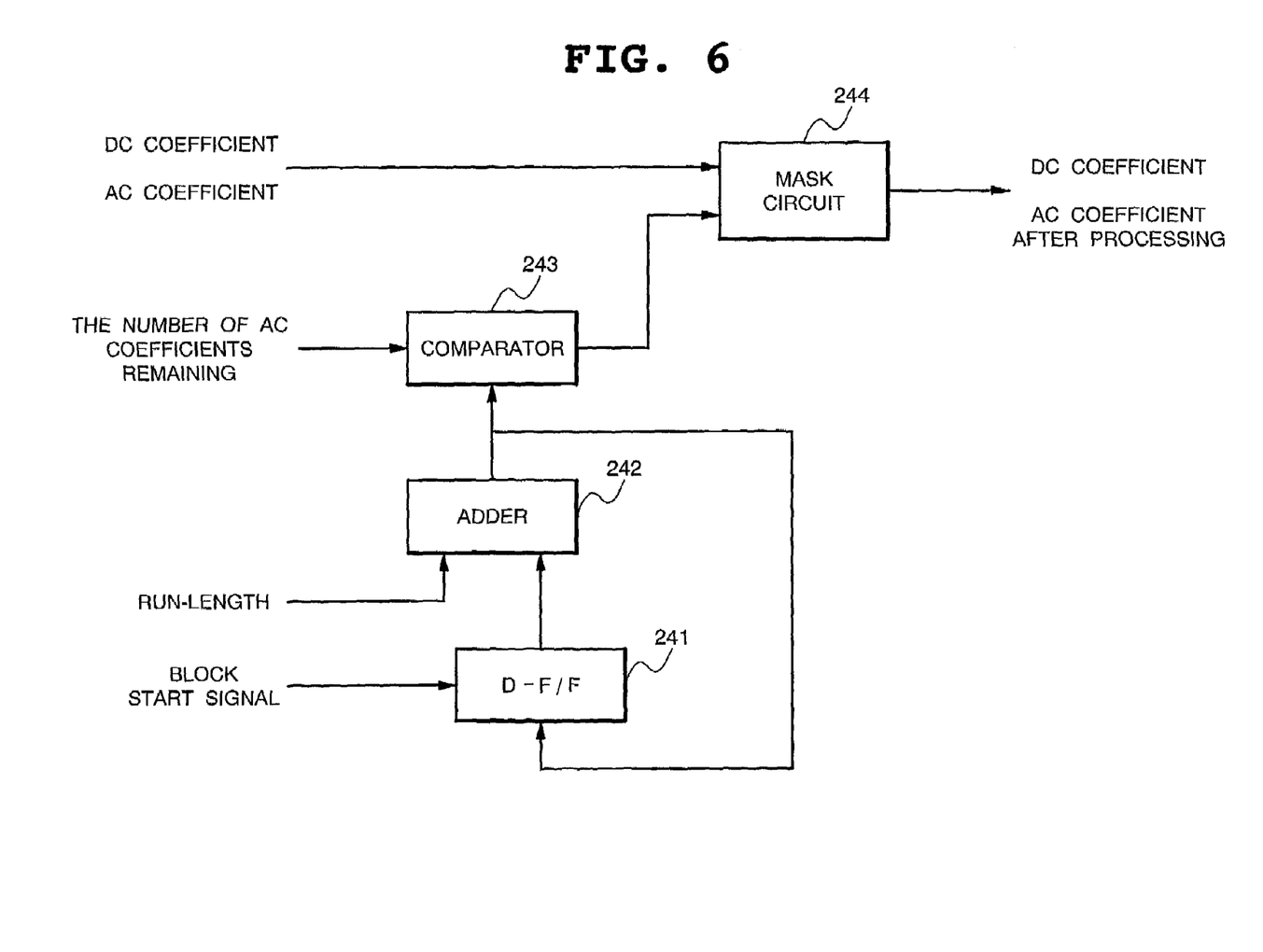
FIG. 6 is a view showing the constitution of the within-block coefficient controlling unit according to an embodiment of the present invention.

In a preferred embodiment of the present invention, the within-block coefficient controlling unit 240 includes a latch circuit 241 which is cleared every time a block starting signal indicating the initial value within one block becomes active and preserves the output of an adder 242 every time the AC component within one block is provided, and the adder 242 which adds the output of the latch circuit 241 and the run-length supplied from the variable-length code decoder, in which the addition result of the adder 242 shows the number of the coefficient at the time of zigzag scanning the DCT coefficients within a block, and it further includes a comparator 243 which compares the position of the AC coefficient to be left as it is as the predetermined value with the output of the adder, and a mask circuit 244 which performs the mask processing on the received DCT coefficient based on the output from the comparator 243 and supplies the AC coefficient having been processed.

The above-mentioned embodiment of the present invention will be further described in detail as follows with reference to the drawings.

FIG. 1 is a view showing the constitution of the embodiment of the present invention. FIG. 1 shows the constitution of an example with the present invention adopted to a system for recording the digital contents compressed and encoded according to the MPEG standard as they are.

The selector (MUX: multiplexer) 100 selects and supplies the contents 10 received from the outward and the contents 20 from the recording device 300.

The selector 100 selects the contents 10 at a time of recording and selects the contents 20 at a time of reproducing. The contents selected by the selector 100 is supplied to the recording data controller 200.

The recording data controller 200 comprises the demultiplexer (DEMUX) 210, the variable-length code decoder (VLD) 220, the FIFO memory (FIFO) 230, the within-block coefficient controlling unit 240, and the variable-length code coder (VLC) 250, the barrel shifter (BSF) 260, and the multiplexer (MUX) 270.

The demultiplexer (DEMUX) 210 separates the received MPEG stream into video data and data other than the video data.

The separated video data is supplied to the variable-length code decoder (VLD) 220 and the data other than the video data is supplied to the FIFO memory (FIFO) 230.

The variable-length code decoder (VLD) 220 decodes the supplied video data and classifies it into the level and the run-length of the MPEG standard, hence to supply the same to the within-block coefficient controlling unit 240.

The within-block coefficient controlling unit 240 performs the coefficient operation such as turning to at all "0" the values of the coefficients other than those of the DC component and the predetermined AC components of a low frequency region within a block of the image data.

The variable-length code coder (VLC) 250 transforms the coefficients from the within-block coefficient controlling unit 240 into variable-length codes.

The barrel shifter 260 combines the variable-length code data from the variable-length code coder (VLC) 250 together to create the MPEG video stream.

The FIFO memory (FIFO) 230 temporarily stores the data other than the video.

The multiplexer (MUX) 270 multiplexes the video data from the barrel shifter 260 and the data other than the video from the FIFO 230 so to supply the MPEG stream.

FIG. 6 is a view showing the detailed constitution of the within-block coefficient controlling unit 240 according to the embodiment of the present invention. A D-typed flip flop (D-F/F) 241 is cleared to 0 every time receiving the initial value of a block 8×8 (namely, DC component), in other words, every time the block starting signal becomes active. Every time receiving the AC component of the block 8×8, it preserves the output of the adder 242.

The adder 242 adds the output of the D-F/F 241 and the run-length supplied from the variable-length code decoder (VLD) 220 (the number of the continuous times of coefficients whose values are 0).

The addition result shows the number of the coefficient at a time of zigzag scanning the DCT coefficient.

The comparator 243 compares the output of the adder 242 with the position of the AC coefficient where its value remains, which is predetermined, and when the output of the adder 242 is smaller than the predetermined value, the comparator 243 supplies "1", while when it is greater than the predetermined value, the comparator 243 supplies "0".

The mask circuit 244 performs the mask processing on the received DC coefficient and AC coefficient, based on the output from the comparator 243. In short, it ANDs the output of the comparator 243 (when the output of the comparator 243 is 0, the mask circuit 244 supplies 0).

The variable-length code decoder (VLD) 220, the variable-length code coder (VLC) 250, and the barrel shifter (BSF) 260 are known in the MPEG system, and the detailed description thereof is omitted.

The digital data supplied from the recording data controller 200 is supplied to the recording/reproducing device 300.

The recording/reproducing device 300 is formed by a device for recording and reproducing the data supplied from the recording data controller 200 as it is.

The operation of the embodiment of the present invention will be described. The constitution of the MPEG stream will be described at first.

Figure 2:
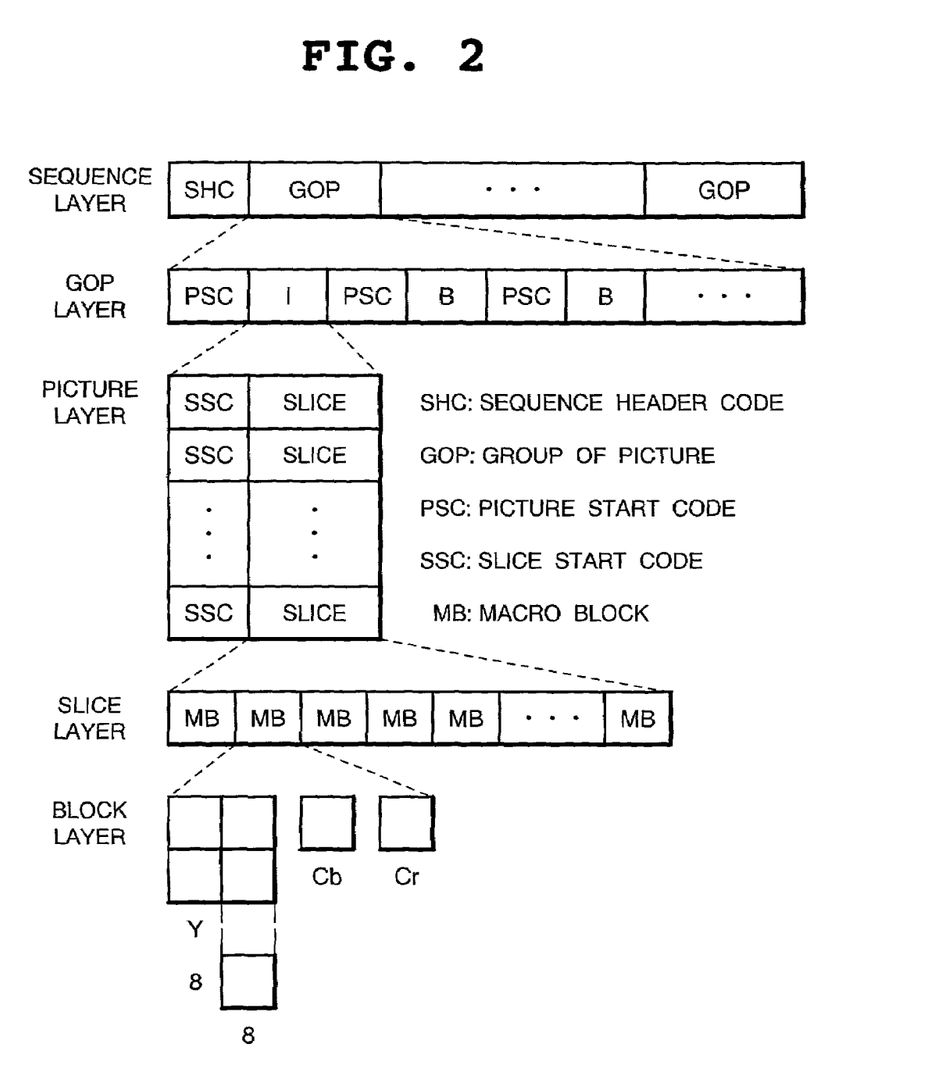
FIG. 2 is a view for use in schematically describing the structure of the MPEG stream.

The image data by the coding method of the MPEG standard has the structure as shown in FIG. 2. The information of each frame or field of the image is described in the picture layer and lower following the picture start code (PSC).

The information of each frame or field is coded by the following three types of picture formats:
Intra-Picture "I-picture"
Predictive Picture "P-picture"
Bidirectionally-Predictive-Picture "B-picture".

The P-picture and the B-picture are to be coded by referring to the other image at a time distance and using only the differential between the same image and itself as the image information. A picture is subdivided into block, transformed by the DCT in every block, quantized by a proper quantization coefficient and encoded by the Huffman code.

The field information of each frame is within a macro block (MB) layer below the slice layer following the slice start code (SSC), and when the color-difference format is 4:2:0, the information is shown by six block layers including four block layers for showing the brightness information Y and two block layers for showing the color-difference information Cb and Cr.

The variable-length coding using the Huffman code will be described further. The quantized DCT coefficient is scanned in the order of the number as shown in FIG. 3 and modified into one-dimensional series string consisting of 64, in the case of zigzag scanning.

Figure 3:
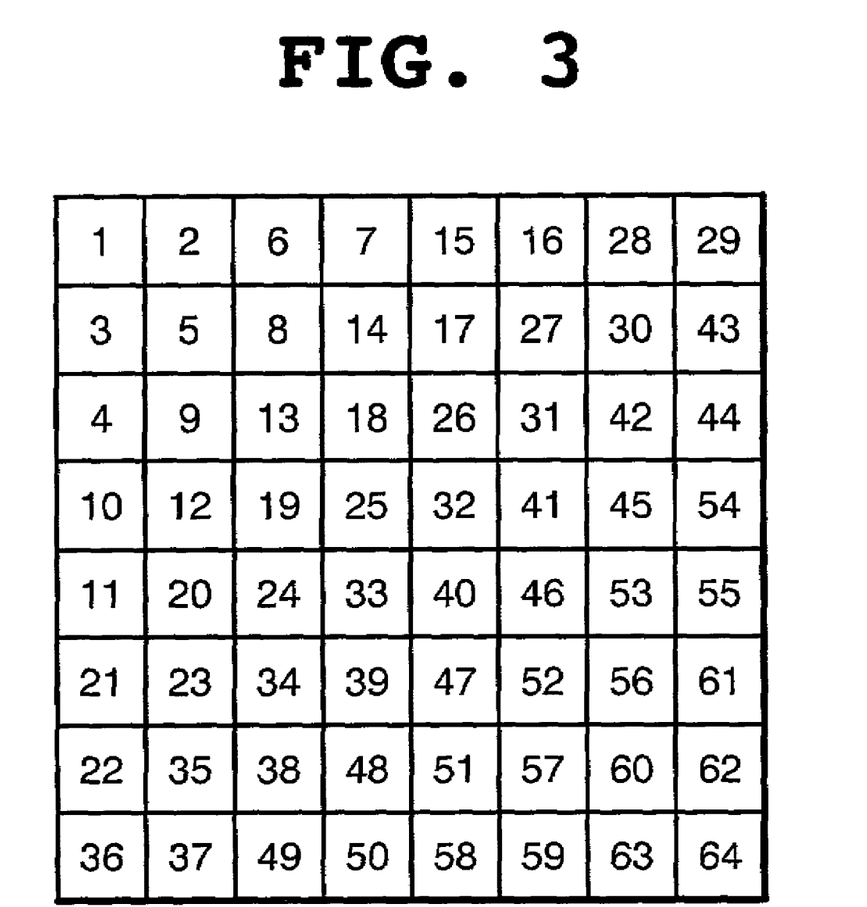
FIG. 3 is a view showing the scanning sequence of coefficients within a block.

In FIG. 3, the position of "1" shows the current (DC) component of the DCT region, the DCT region becomes higher in the horizontal direction along the rightward direction from here and the DCT region becomes higher in the vertical direction along the lower direction.

Accordingly, starting from the position of "1" at the top left corner at first, scanning follows in the order of "2", "3", ..., "64", namely in a slanting direction zigzag from the lower area to the higher area of the DCT region.

In this one-dimensional series string of 64, the non-zero coefficient amplitude (referred to as "level") excluding the DC component of the DCT coefficient (the initial component of the one-dimensional series string) is sequentially combined with the period of continuous zero coefficients prior to that (referred to as "run").

The variable-length code is respectively assigned to a combination of the run and level.

Figure 4:
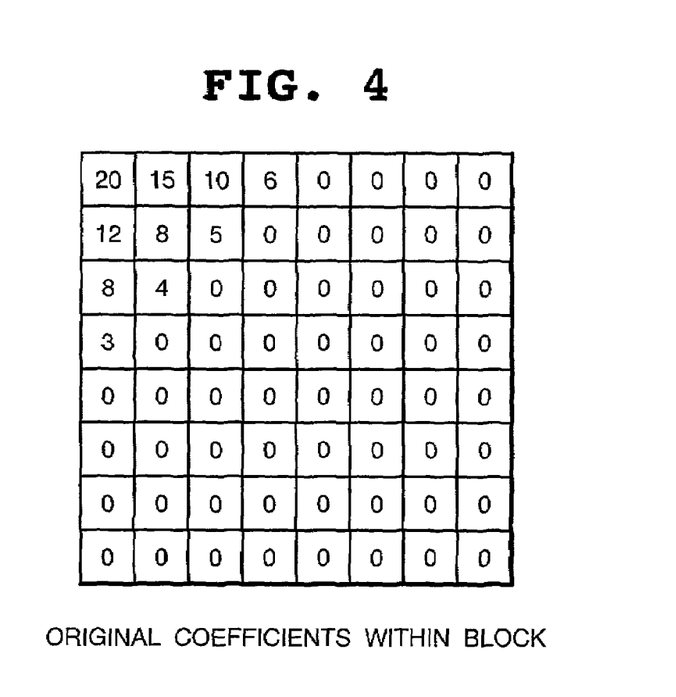
FIG. 4 is a view showing coefficients within the original block for use in describing the data processing of a within-block coefficient controlling unit according to an embodiment of the present invention.
Figure 5:
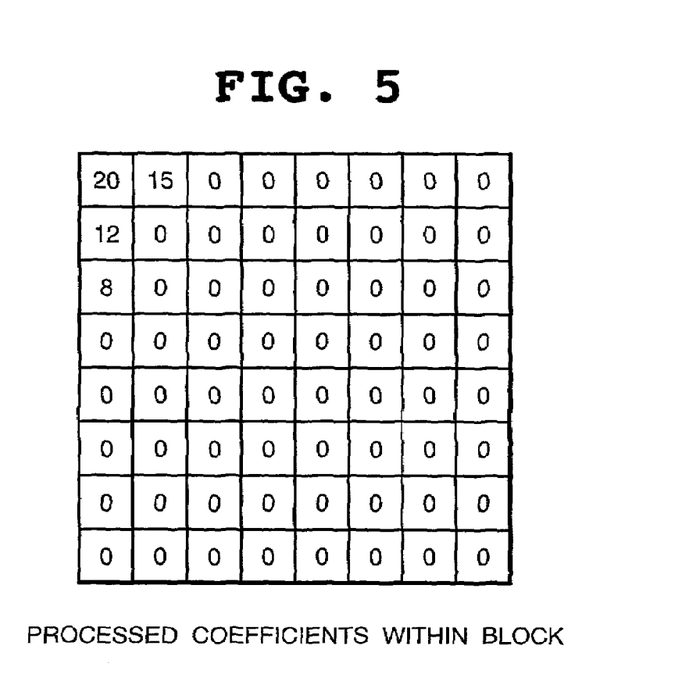
FIG. 5 is a view showing coefficients within the processed block for use in describing the data processing of the within-block coefficient controlling unit according to an embodiment of the present invention.

FIG. 4 and FIG. 5 are tables showing one portion of the variable-length code assignment method. This table is referred to as a variable-length code table.

For example,

As for the combination that the run is 0 and the level is 5, the code 00100110s is assigned, As for the combination that the run is 0 and the level is 6, the code 00100001s is assigned. Where, the end letter s of the code is a code bit.

The variable-length table is constituted as below. Namely, with a group of combinations of run and level within the whole DCT region as for 64 regarded as the source string, their probability is predetermined, and each code is assigned by the Huffman coding.

Figure 7:
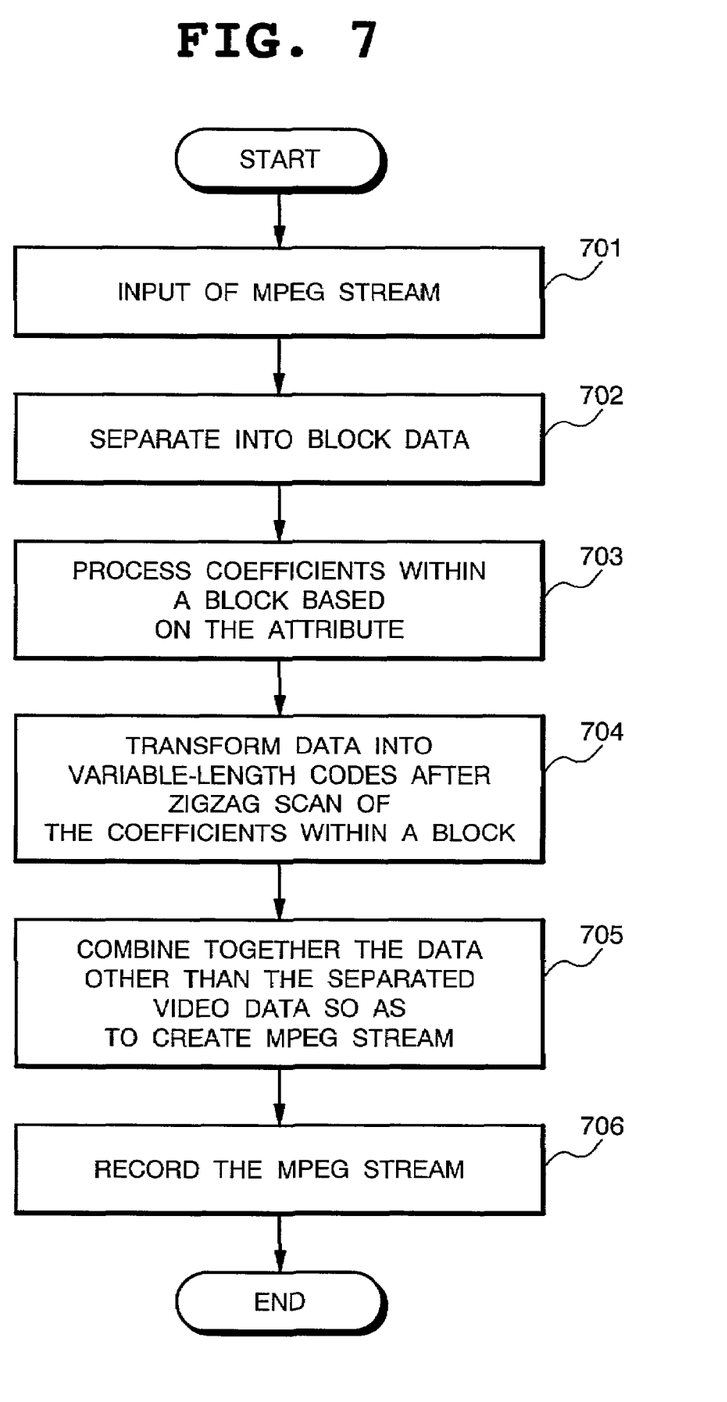
FIG. 7 is a flow chart showing operation of a copy controlling system of digital contents of the embodiment of the present invention.

On the assumption that the above is understood, the operation of the embodiment of the present invention will be described with reference to the flow chart of FIG. 7. Here, the description will be made in the case where the coefficients where the AC component remains are three.

The received MPEG stream (Step 701) is processed by the demultiplexer (DEMUX) 210, the variable-length code decoder (VLD) 220, and an inverse quantizing unit (not illustrated), and subdivided, for example, in the data of the block 8×8 as shown in FIG. 4 (Step 702).

While, the attribute (NeverCopy, NoMoreCopy, CopyOnce, CopyFree) of the stream is supplied from another path different from that of the received MPEG stream.

The NeverCopy and NoMoreCopy are the attributes indicating "recording is prohibited", which are used in order to prevent from copying contents illegally so to sell.

When the attribute is supplied to the within-block coefficient controlling unit 240, all the values of the coefficients are turned to 0 as shown in FIG. 5 (Step 703), other than the DC component (the value is 20) at the top left corner and the three AC components (the values are 15, 12, 8) within the block 8×8 shown in FIG. 4.

The coefficients within the block shown in FIG. 5 are scanned zigzag, the data is transformed into variable-length codes by the variable-length code coder (VLC) 250 (Step 704) and combined together by the barrel shifter (BSF) 260 so to create video stream, and combined with the data other than the video data separated in the input stage so to create the MPEG stream (Step 705). This MPEG stream is supplied to the recording device 300 and recorded there (Step 706).

In the DCT block 8×8, it becomes a finer image according as the number of the AC coefficients becomes greater.

If the number of the AC coefficients is a few as in the present invention, the reproduced image becomes clear in the boundary of the block and the recorded tape cannot be sold to a third person. As the result, a copyright of the contents' owner can be secured.

On the other hand, a user who records the contents can record images narrowly and further the sound completely. Therefore, the user can understand the outline of the recorded contents.

In the case of the recorded contents of the NeverCopy or NoMoreCopy, block noise occurs to the recorded image, and in the case of the CopyOnce or CopyFree, the contents are recorded completely.

Thus, a user can find the recording attribute by reproducing the recorded contents with no need to know the recording attribute of the contents in advance.

Generally, the compression ratio of the contents is inversely proportional to the number of the AC coefficients of the contents within the block 8×8. Namely, when the compression ratio is high, the number of the AC coefficients within a block is small, and when the compression ratio is low, the number of the AC coefficients is large.

Accordingly, when the number of the AC coefficients remaining is always constant regardless of the contents to be processed, as the above-mentioned embodiment, there are some cases of having little influence of copying control.

In order to solve this problem, in a second embodiment of the present invention, a function of controlling the number of the AC coefficients remaining, correspondingly to the compression ratio of the contents, is added. Namely, in the second embodiment of the present invention, the number of the AC coefficients remaining is controlled based on the bit rate of the contents. More specifically, by extracting the data of the bit rate within the stream of the contents to be processed, the number of the AC coefficients remaining is determined based on this value and supplied to the comparator 243 of FIG. 6.

Thanks to this constitution, in the case of the contents having high compression ratio (in other words, low bit rate), the number of the AC coefficients remaining can be small, and in the case of the contents having low compression ratio (in other words, high bit rate), the number of the AC coefficients remaining can be large. Thus, the problem of the first embodiment can be compensated.

The copy controlling method of the digital contents of the embodiment can be realized not only by hardware, of course, but it can be realized by loading a computer program having each function (copying control program) into a memory of a computer. The copying control program is stored in a storing medium such as a magnetic disk, a semiconductor memory, and the like (reference numeral). Then, the program is loaded from the storing medium into the computer so as to control the operation of the computer, thereby realizing the above-mentioned respective functions.

As set forth hereinabove, according to the present invention, the following effects can be realized.

First, it is possible to prevent illegal copying by actually spoiling the illegal copy. This is because, in the present invention, the number of the AC coefficients is set small, of all the DCT coefficients within a block as for the contents which cannot be copied, when the number of the AC coefficients within a block is small, the boundary of the block becomes clear at a time of reproducing the image, and in view of the image quality, such recorded tape cannot be sold to a third party. As the result, a copyright of the contents' owner can be secured.

Second, as for the image with copying restriction, since it can be recorded narrowly and the sound thereof, however, can be recorded completely, a user can know the outline of the recorded contents at a time of reproducing the recorded contents, and further know the recording attribute, which improves the convenience. The data is incorrectly recorded, which puts a maker in relief, excluding the possibility of a user's making a complaint to the maker.

Third, in the case of the contents having high compression ratio, the number of the AC coefficients remaining can be set small, and in the case of the contents having low compression ratio, the number of the AC coefficients remaining can be set large, thereby to spoil the illegal copy accurately.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A copy controlling system in a device for recording digital contents compressed and delivered by the MPEG (Moving Picture Coding Experts Group) standard, comprising:
   a means for requiring even a discrete cosine transform (referred to as "DCT") coefficient of the digital contents, in decoding the digital contents;
   a within-block coefficient controlling means for changing the DCT coefficients within a block, according to attribute information relative to recording restriction of the digital contents; and
   a means for creating stream data for recording after encoding again the obtained DCT coefficients, wherein
   the attribute information of the digital contents includes at least one of the following information: recording is prohibited (NeverCopy); since it was recorded once, no more recording is permitted (NoMorecopy); only one recording is permitted (CopyOnce); and recording is free (CopyFree), and
   said within-block coefficient controlling means turns to all 0, the values of the DCT coefficients within one block other than a DC (direct current) component and a few AC (Alternating Current) components of a low frequency region, based on the attribute information.

2. A copy controlling system as set forth in claim 1, in which
   in the case of the digital contents whose attribute information is the CopyOnce, information for changing the above to the attribute NoMoreCopy is added to the DCT coefficients.

3. A copy controlling system as set forth in claim 1, in which
   in said within-block coefficient controlling means, in the case of the digital contents whose attribute information is the NeverCopy or the NoMoreCopy, the number of the AC components whose values remain in the DCT coefficients within one block is increased or decreased periodically with time.

4. A copy controlling system as set forth in claim 1, in which
   in said within-block coefficient controlling means, in the case of the digital contents whose attribute information is the NeverCopy or the NoMoreCopy, the number of the AC coefficients whose values remain in the DCT coefficients within one block is varied, based on the compression ratio of the digital contents; and in the case of the digital contents having a high compression ratio, the number of the AC coefficients whose values remain is set small, while in the case of the digital contents having a low compression ratio, the number of the AC coefficients whose values remain is set large.

5. A recording data controlling system for receiving a stream selected by a selector, of the MPEG (Moving Picture Coding Experts Group) stream delivered through a broadcast or a network and the reproduced MPEG stream from a reproducing device, comprising:
   a demultiplexer for separating the received MPEG stream into video data and data other than the video data;
   a variable-length code decoder for decoding the video data separated by said demultiplexer into even discrete cosine transform (referred to as "DCT") coefficients and classifying the above into run-length and level of the MPEG standard;
   a within-block coefficient controlling unit for turning to 0 the values of the DCT coefficients within a block other than a DC component and a predetermined number of AC components of low frequency region;
   a variable-length code coder for converting the coefficients from the within-block coefficient controller into variable-length codes;
   a barrel shifter for combining together code data of variable-length from said variable-length code coder and creating the MPEG video stream;
   a FIFO memory for temporarily storing data other than the video data separated by said demultiplexer; and
   a multiplexer for multiplexing the video data from said barrel shifter and the data other than the video data from said FIFO memory so to supply the MPEG stream for recording.

6. A recording data controlling system as set forth in claim 5, in which
   the attribute information relative to recording restriction of the received MPEG stream is at least one of the following cases: recording is prohibited (NeverCopy); since it was recorded once, no more recording is permitted (NoMoreCopy); only one recording is permitted (CopyOnce); and recording is free (CopyFree),
   the attribute information of the MPEG stream is supplied via another path different from that of the received MPEG stream, and
   when the attribute information of the MPEG stream is the NeverCopy or the NoMoreCopy, the attribute information is supplied to said within-block coefficient controlling unit, where the values of all the coefficients within one block other than a DC component and a AC component adjacent to the DC component are turned to all 0.

7. A recoding data controlling system as set forth in claim 5, in which
   said within-block coefficient controlling unit further including a latch circuit which is cleared every time a block start signal indicating the initial value within one block becomes active and preserves the output of an adder every time the AC component within one block is supplied;
   an adder for adding the output of said latch circuit and run-length supplied from said variable-length code decoder,
   the addition result of said adder indicating the number of the coefficient at a time of zigzag scanning the DCT coefficients within a block;

a comparator for comparing the output of said adder with the position of the AC coefficient whose value remains which is predetermined; and a mask circuit for performing mask processing on the received DCT coefficients, based on the output from said comparator, and supplying the processed DCT coefficients.

8. A copy controlling method of digital contents in a system for recording the digital contents compressed and delivered by the MPEG (Moving Picture Coding Experts Group) standard, comprising the steps of:

a step of requiring even a discrete cosine transform (referred to as "DCT") coefficient of the digital contents, in decoding the digital contents, and changing the DCT coefficients within a block, according to attribute information relative to recording restriction of the digital contents; and a step of creating stream data for recording after encoding again the obtained DCT coefficients, wherein the attribute information of the digital contents includes at least one of the following information: recording is prohibited (NeverCopy); since it was recorded once, no more recording is permitted (NoMorecopy); only one recording is permitted (CopyOnce); and recording is free (CopyFree), and the values of the DCT coefficients within one block other than a DC (direct current) component and a few AC (Alternating Current) components of a low frequency region are turned to all 0 according to said attribute information.

9. A copy controlling method as set forth in claim 8, in which in the case of the digital contents whose attribute information is the CopyOnce, information for changing the above to the attribute NoMoreCopy is added to the DCT coefficients.

10. A copy controlling method as set forth in claim 8, in which in the case of the digital contents whose attribute information is the NeverCopy or the NoMoreCopy, the number of the AC components whose values remain, in the DCT coefficients within one block, is increased or decreased periodically with time, not turned to 0.

11. A copy controlling method as set forth in claim 8, in which in the case of the digital contents whose attribute information is the NeverCopy or the NoMoreCopy, the number of the AC coefficients whose values remain, in the DCT coefficients within one block, is varied, based on the compression ratio of the digital contents; and in the case of the digital contents having a high compression ratio, the number of the AC coefficients whose values remain is set small, while in the case of the digital contents having a low compression ratio, the number of the AC coefficients whose values remain is set large.

12. A computer readable memory for storing a copy controlling program for executing a copy control of digital contents while controlling a computer in a system for recording the digital contents compressed and delivered by the MPEG (Moving Picture Coding Experts Group) standard, the copy controlling program including:

a step of requiring even a discrete cosine transform (referred to as "DCT") coefficient of the digital contents in decoding the digital contents, and changing the DCT coefficients, according to attribute information relative to recording restriction of the digital contents; and a step of creating stream data for recording after encoding again the obtained DCT coefficients, wherein the attribute information of the digital contents includes at least one of the following information: recording is prohibited (NeverCopy); since it was recorded once, no more recording is permitted (NoMoreCopy); only one recording is permitted (CopyOnce); and recording is free (CopyFree), and the values of the DCT coefficients within one block other than a DC (direct current) component and a few AC (Alternating Current) components of a low frequency region are turned to all 0 according to said attribute information.

13. A computer readable memory for storing a copy controlling program as set forth in claim 12, in which in the case of the digital contents whose attribute information is the CopyOnce, information for changing the above to the attribute NoMoreCopy is added to the DCT coefficients.

14. A computer readable memory for storing a copy controlling program as set forth in claim 12, in which in the case of the digital contents whose attribute information is the NeverCopy or the NoMoreCopy, the number of the AC components whose values remain, in the DCT coefficients within one block, is increased or decreased periodically with time, not turned to 0.

15. A computer readable memory for storing a copy controlling program as set forth in claim 12, in which in the case of the digital contents whose attribute information is the NeverCopy or the NoMoreCopy, the number of the AC coefficients whose values remain, in the DCT coefficients within one block, is varied, based on the compression ratio of the digital contents; and in the case of the digital contents having a high compression ratio, the number of the AC coefficients whose values remain is set small, while in the case of the digital contents having a low compression ratio, the number of the AC coefficients whose values remain is set large.

* * * * *